UNITED STATES PATENT OFFICE.

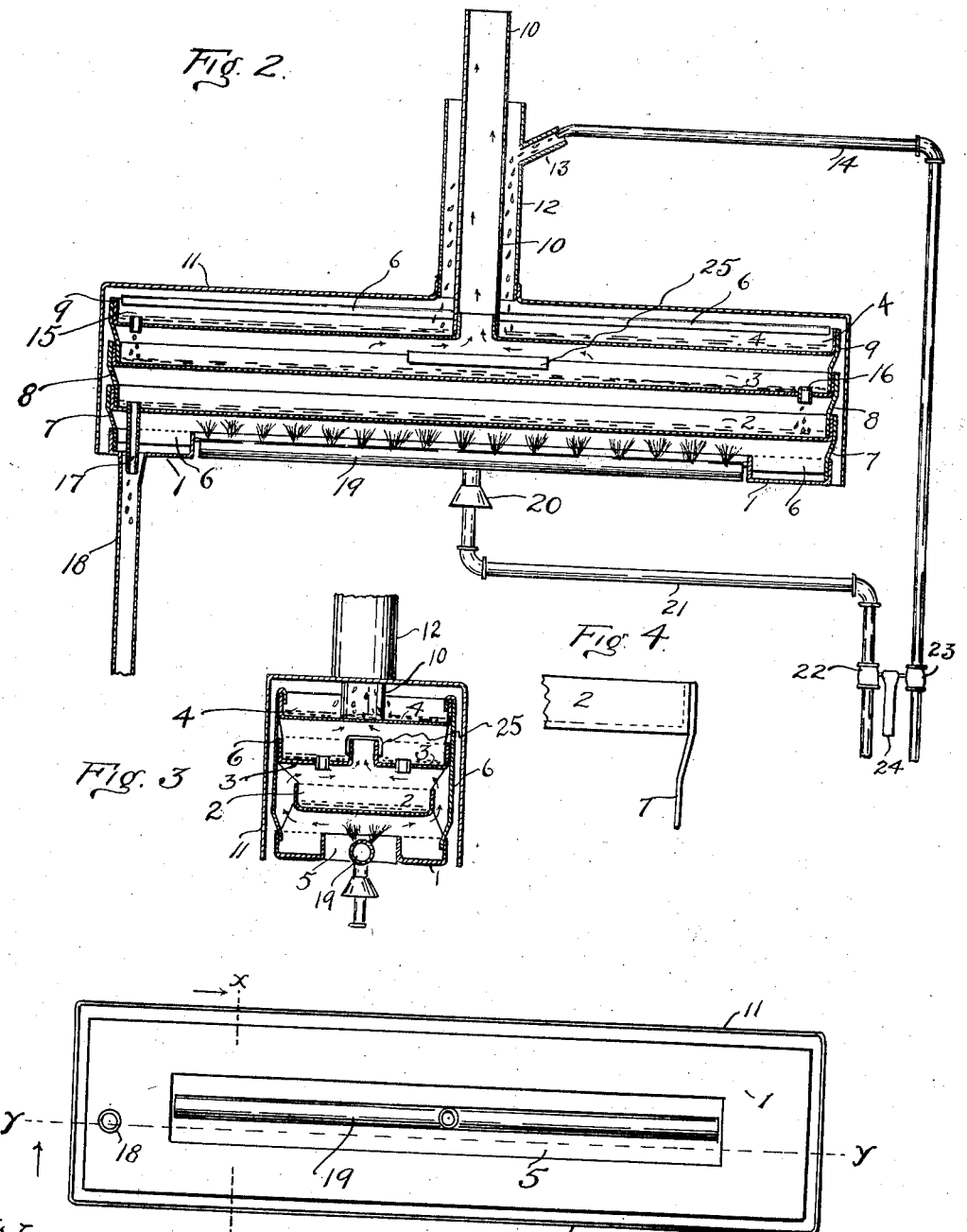

PHILIP G. HUBERT, OF LOS ANGELES, CALIFORNIA; LILY E. G. HUBERT, EXECUTRIX OF SAID PHILIP G. HUBERT, DECEASED, ASSIGNOR TO LILY E. G. HUBERT, INDIVIDUALLY.

INSTANTANEOUS WATER-HEATER.

1,038,140.  Specification of Letters Patent.  Patented Sept. 10, 1912.

Application filed April 22, 1911. Serial No. 622,740.

*To all whom it may concern:*

Be it known that I, PHILIP G. HUBERT, a citizen of the United States, residing at Los Angeles, California, have invented a new and useful Improvement in Instantaneous Water-Heaters, of which the following is a specification.

My invention relates to a new and improved construction in water heaters.

The object of the invention is to provide a simple, non-explosive water heater having the greatest possible economy in the consumption of fuel.

Another beneficial feature of my invention is the means provided for preventing damage if any of the pans become leaky or overflow. The means by which these beneficial results are accomplished is illustrated in the accompanying drawings in which—

Figure 1 is a bottom plan view of a complete heater. Fig. 2 is a longitudinal section taken on the dotted line y—y in Fig. 1. Fig. 3 is a transverse section taken on the dotted line x—x in Fig. 1. Fig. 4 is a fragmental side view of one of the pans.

Throughout the several views like characters refer to like parts.

In the details of construction 1 indicates the bottom pan. This pan is rectangular in shape and is built with a rectangular burner space 5 extending longitudinally along its center. The inner walls of this pan surround the burner on four sides. A rectangular water pan 2 is placed directly above the pan 1 with its center over and parallel to the burner. This pan is made narrower than the pan 1 and spaces are left on either side between the pan 2 and the inclosing sides 6. The spaces thus formed serve as flues for the passage of the burning gases and vapors from the burner 19. The pan 2 is supported by means of the apron 7 attached to each end of said pan and fitted and shaped to enter end of the pan 1.

3 is a double pan having two parallel compartments. A space is left between the two compartments about double that left on either side of the pan 2. The combined width of the two compartments and the space between them equals the extreme width of the pan 1. The two compartments are united at their ends by an apron 8 which fits into the pan 2 and is like the apron 7 in construction. The top pan 4 is supported over the pan 3 by aprons 9 in the same manner. The pan 4 is rectangular in shape, of the same width as pan 3. It has a circular vent formed through its center for the passage of heat and gases. A vent pipe 10 is connected with the vent in pan 4 and serves to carry away the fumes. A cover 11 is used to inclose the heater. The pipe 10 has a jacket 12 with an opening 13 into which the water is supplied from the pipe 14. The jacket 12 is supported by the cover 11 in the manner shown. 15 refers to tubes projecting above and below the bottom of the pan 4.

The height of the projection inside the pan governs the depth of the water in the pan and when the desired depth is secured the tubes serve as an overflow to discharge the water into the pan 3 below. Each of the double compartments in the pan 3 has a similar overflow pipe 16 discharging into the pan 2. A discharge pipe 17 is provided for the pan 2 similar to the tubes 15 and 16. This tube projects above the bottom of the pan an amount equal to the desired depth of the water. On the under side it extends through the pan 1 and into a pipe 18 connected with the pan 1. The top of this pipe 18 is flush with the bottom of the pan 1 and is larger in diameter than the pipe 17 leaving an annular space between the pipes 17 and 18.

19 is a suitable gas burner.

20 is the gas mixer.

21 is the gas supply pipe.

22 and 23 are gas and water cocks operated by a common lever 24.

25 is a U shaped piece of metal placed over the two adjacent edges of compartments of the pan 3 directly under the vent in the pan 4.

The various parts of the heater may be assembled as follows:—The pan 1 with the burner 19 secured in the opening 5 is placed on a suitable shelf or bracket, (not shown). The burner is then connected with the supply pipe. This pan should be level. The pans 2, 3 and 4 are placed above the pan 1 and supported in their relative positions by means of the aprons 7, 8 and 9. The member 25 is put in the position shown before the pan 4 is placed. The bottom edge of the two inclosing sides 6 are inserted in the pan 1 and the grooves shown on the top edges engage the edges of the pan 4, forming a complete wall on each side. These parts may be bolted or otherwise fastened together but this is not essential. The vent pipe 10 is then connected with a vent through the pan 4. The cover 11 is placed over the parts thus far assembled. The jacket 12 is connected with the cover and the water supply pipe connected with the opening 13.

In use a light is applied to the burner 19 and the water and gas turned on simultaneously by means of the lever 24. The fire and heat from the burner passes up around the bottom and edges of the pan 2 across the bottom and through the spaces between the compartments of the pan 3. The part 25 here serves to distribute the heat over the bottom of the pan 4 instead of allowing it to pass directly out through the vent. After circulating over the bottom of the pan 4 the heat passes through the vent in the bottom of the pan 4 and out through the vent pipe 10. At the same time water is sprayed from the pipe 14 through the opening 13 upon the vent 10 through which the heat is escaping. The water thus absorbs considerable heat before reaching the pan 4. The water then distributes over the bottom of pan 4 and overflows through the tubes 15 to the pan 3; thence through the tubes 16 to the pan 2; thence through the tube 17 to the discharge pipe 18. It is thus seen that no water is discharged into the pan 1. With the proper amount of fire at the burner the water is sufficiently heated when it reaches the tube 17.

One of the very important features of the invention is the function performed by the pan 1. This pan serves to gather and discharge all water accumulating from leakage and sweating. The aprons 7 and the inclosing sides 6 convey all water escaping from the pans above into this pan. Should a leak develop while the heater is not in operation this pan gathers the leakage and prevents damage to the floors and walls of the building. The aprons 8 and 9 guide any leakage at the ends of pans to the inside of the next pan below and the several aprons also provide a simple means for leveling up and supporting the several pans. With this arrangement for caring for leaks the heater may be used for a long time even after small leaks develop.

Having thus described my invention what I claim as new and desire to secure by Letters Patent is—

In a water heater: the combination of a pan 1 for collecting leakage and moisture due to sweating; a discharge pipe 18 in the bottom of said pan; a gas burner 19 secured within a rectangular burner space in said pan 1; a pan 2 supported by aprons 7 above said pan 1; a tube 17 for discharging overflow from pan 2 into pipe 18; a double compartment pan 3 supported by aprons 8 above said pan 2; suitable overflow pipes 16 in said pan 3; a pan 4 supported by aprons 9 above said pan 3; suitable overflow pipes 15 in said pan 4; a suitable vent passing through said pan 4 adapted to carry off the burned gases; said aprons 7, 8 and 9 adapted to support said pans 2, 3 and 4 and also to direct leakage from either of said pans to the pan below; suitable removable sides 6 adapted to inclose the sides of said pans and direct leakage to the bottom pan 1; a suitable outer cover inclosing said pans; a jacket pipe connected with said cover and surrounding said vent pipe; and a suitable water supply tube for admitting water to said jacket.

PHILIP G. HUBERT.

Witnesses:
LILY E. G. HUBERT,
C. L. McKESSON.